UNITED STATES PATENT OFFICE.

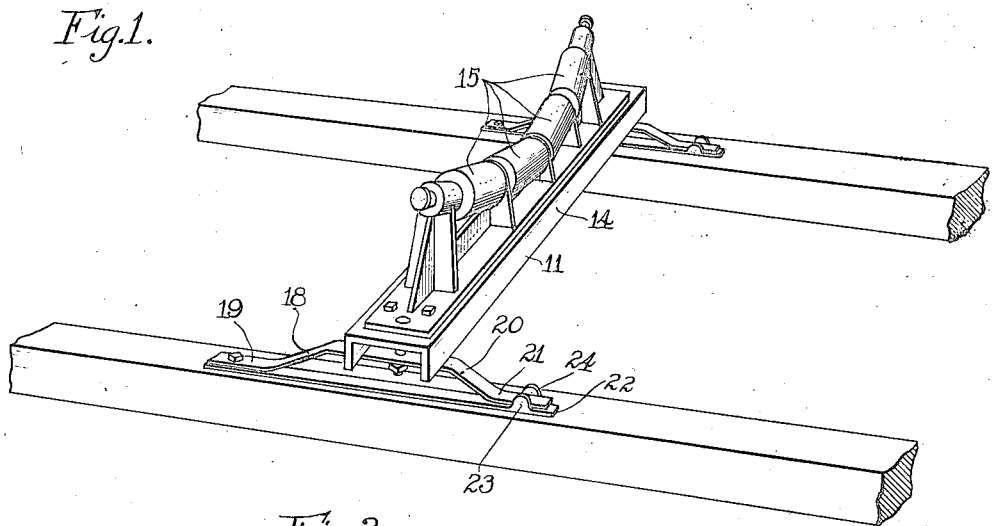
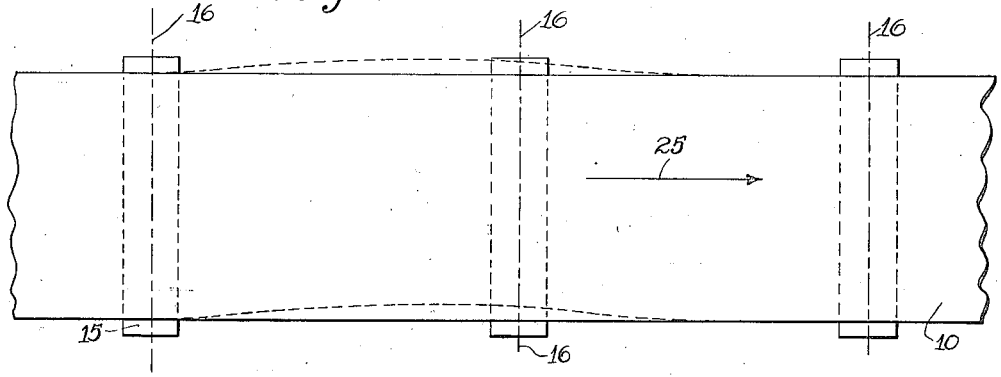
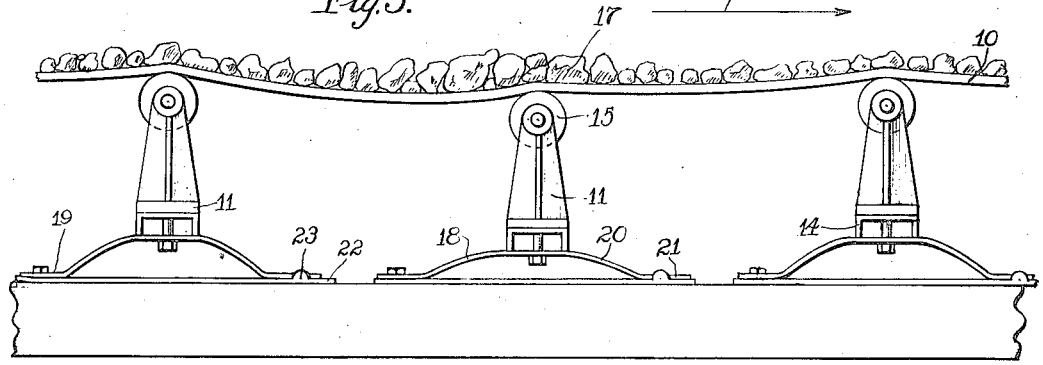

MYRON A. KENDALL, OF AURORA, ILLINOIS, ASSIGNOR TO STEPHENS-ADAMSON MFG. CO., OF AURORA, ILLINOIS, A CORPORATION OF ILLINOIS.

SELF-TRAINING BELT CONVEYER.

1,423,528.    Specification of Letters Patent.    Patented July 25, 1922.

Application filed July 8, 1921. Serial No. 483,270.

*To all whom it may concern:*

Be it known that I, MYRON A. KENDALL, a citizen of the United States, and resident of Aurora, county of Kane, and State of Illinois, have invented certain new and useful Improvements in Self-Training Belt Conveyers, of which the following is a specification, and which are illustrated in the accompanying drawings, forming a part thereof.

The invention relates to belt conveyers and has for its object to provide a belt conveyer of improved construction having particular reference to reducing the amount of wear upon the belt, reducing the amount of power required for operating the same under a given load and the provision of means for automatically maintaining the alignment of the belt upon the carriers over which it travels. In the construction of belt conveyers, the cost of the belt frequently represents as much as one-half the entire cost of the complete installation. Furthermore, as the belt is used both for directly supporting the load and for transmitting the power by which the load is moved, the belt is subjected to abrasion and strain and must be renewed from time to time. It is also recognized that when guide rollers or the like are required for engaging the edge of the belt to maintain its alignment with the carriers upon which it travels, these rollers are the cause of excessive wear upon the belt due partly to abrasion of the belt along its edges, but more especially to the tendency which the guide rollers have to bend or fold the belt in the direction of its length. It follows that the provision of means for reducing the destructive wear upon the belt should result in effecting an important saving in the cost of operating a belt conveyer. It will also be understood that the said destructive wear upon the belt may be reduced in three ways, as follows;—by reducing the direct abrasion of the belt by the load, by reducing the amount of power required to be transmitted through the belt for moving the load and finally by maintaining the alignment of the belt upon the carriers over which it travels without the use of guide rollers or the like for engaging the edges of the belt. The invention accordingly contemplates a construction of belt conveyer in which excessive wear upon the belt is avoided for each of the three reasons just mentioned.

An illustrative embodiment of the invention is shown in the accompanying drawings in which;—

Fig. 1 is a detail perspective view showing one of the carriers upon which the belt travels and an adjacent part of the supporting frame;

Fig. 2 is a detail plan view of the improved belt conveyer, the operation of the improved construction in automatically maintaining the alignment of the belt upon the carriers being diagrammatically illustrated by dotted lines;

Fig. 3 is a detail central longitudinal sectional view of the improved belt conveyer with its load, the depression of the belt by its load being somewhat exaggerated with reference to the distance between the carriers.

As usual, the belt conveyer comprises a continuous belt, as 10, (Figs. 2 and 3) and a plurality of carriers, as 11, over which the belt travels. The carriers 11 are arranged at intervals along a suitable frame comprising the sills 12 and 13, and each carrier is preferably constructed to support the belt in the form of a trough. As shown, each carrier 11 comprises a base plate 14 which is transversely arranged with reference to the sills 12, 13, of the conveyer frame, and a plurality of rollers 15 suitably supported upon the base plate 14 for engaging the underside of the belt 10 for imparting thereto the desired trough shape.

In providing the feature of self-training, advantage is preferably taken both of the fact that the belt, as 10, will tend to run to the high side of the carrier 11 if either end of the transverse axis, as 16, of the carrier is depressed, and of the fact that the belt will tend to run toward the rearward end of the carrier if the said carrier axis is swung to an inclined position across the carrier frame. It follows that if each carrier 11 is so supported at its opposite ends as to yield downwardly and forwardly to undue pressure, movement of the belt 10, and its load, as 17, (Fig. 3) toward either end of the carrier will result in movement of the carrier to a position tending to restore the belt to its proper position.

In the preferred construction of the improved belt conveyer each carrier 11 is accordingly supported upon springs 18 of the form illustrated in Figs. 1 and 3. As shown, each spring 18 takes the form of a bar which is longitudinally arranged with respect to the direction of travel of the belt and is bowed upwardly intermediate its ends. One end, as 19, of each of these springs is bolted to the corresponding sill 12 or 13 of the carrier frame and the adjacent end of the base plate 14 of the carrier is bolted to the upwardly bowed portion 20 of the spring. The remaining end, as 21, of the spring has a sliding bearing upon the corresponding sill, as 12, for longitudinal movement thereon. Preferably a wear plate 22 extends under each spring 18 throughout its length, such wear plate being formed with upstanding side flanges 23, 24, adjacent one end for the purpose of guiding the movable end 21 of the spring.

Assuming the belt 10 to be traveling in the direction indicated by the arrow 25, shown on Figs. 2 and 3, and that the belt is for any reason horizontally deflected to the position indicated by dotted lines in Fig. 2, the consequent lateral shifting of the weight of the loaded belt upon the adjacent carrier will cause a downward and forward deflection of the carrier at one end, due to the flattening of the corresponding spring 18, while the other end of the carrier will move upwardly and backwardly, due to the greater arching of the corresponding spring 18. As a result of this movement the carrier will have assumed a transversely inclined and oblique position tending to restore the belt to its normal position because of the tendency of the belt to run toward the higher and more retracted end of the carrier. The explanation of the fact that a conveyer belt tends to move laterally toward the retracted end of an oblique carrier should be readily apparent from the well known circumstance that any object which is traveling upon the rollers can be laterally deflected by twisting the rollers upon which it moves. While the explanation of the tendency of the belt to move toward the higher end of a vertically inclined carrier is not so apparent, it is a common practice in the training of conveyer belts to elevate certain carriers at one end by shims, or the like, for the purpose of securing such a lateral deflection of the belt.

While the automatic training of the belt is an important feature of the improved construction, it will also be understood that wear upon the belt is greatly reduced by the cushioning of the shocks incident to the engagement of the belt and its load with the several carriers. As illustrated in Fig. 3, sagging of the loaded belt between the several carriers is inevitable. It follows that each part of the belt and its load is raised as they travel over each carrier and there is a resulting downward and forward thrust upon the carrier. In the form of construction shown both the downward and forward thrusts upon the carrier are effectively cushioned by the supporting springs.

I claim as my invention:—

1. In a belt conveyer, the combination with a traveling load carrying belt, of a transverse carrier for the belt, and a spring yielding downwardly and forwardly with respect to the direction of movement of the belt supporting each end of the carrier.

2. In a belt conveyer, the combination with a traveling load carrying belt of a transverse roller equipped carrier for the belt and a spring yielding downwardly and forwardly with respect to the direction of movement of the belt, supporting each end of the carrier.

3. In a belt conveyer, the combination with a traveling load carrying belt and a transverse roller equipped carrier for the belt, of means for automatically centering the moving belt upon the carrier comprising a support for the carrier permitting a horizontal turning movement of the carrier upon unequal loading of the same adjacent its opposite ends.

4. In a belt conveyer, the combination with a traveling load carrying belt and a transverse roller equipped carrier for the belt, of means for automatically centering the moving belt upon the carrier comprising a support for the carrier permitting simultaneous tilting and horizontal turning movement of the carrier upon unequal loading of the same adjacent its opposite ends.

5. In a belt conveyer, in combination, a traveling load carrying belt, a plurality of transverse roller equipped supporting brackets and resilient upwardly bowed supporting bars for said brackets, each bar having one end fixed and the other slidable, the upwardly bowed portion of each bar being secured to the under portion of its respective bracket.

6. In a belt conveyer, in combination, a traveling load carrying belt, a transverse roller equipped carrier for the belt, a leaf spring supporting each end of the carrier, one end of each spring being fixed and the other slidable longitudinally with respect to the belt.

7. In a belt conveyer, the combination with a load carrying belt of a transverse roller equipped carrier for the belt, a pair of resilient upwardly bowed supporting bars, one for each end of the carrier, one end only of each bar being fixed and the other slidable longitudinally with respect to the direction of movement.

8. In a belt conveyer, the combination with a traveling load carrying belt, and a transverse roller equipped carrier for the belt, of a pair of yielding supporting bars upwardly bowed adjacent their ends and longitudinally arranged with respect to the direction of travel of the belt, one end only of each bar being fixed.

9. In a belt conveyer, the combination with a traveling load carrying belt of a transverse carrier for the belt and a spring yielding downwardly and forwardly with respect to the direction of movement of the belt supporting one end of the carrier.

MYRON A. KENDALL.